(12) United States Patent
Fay, II et al.

(10) Patent No.: US 10,091,937 B2
(45) Date of Patent: Oct. 9, 2018

(54) BALE WAGON CLAMP MECHANISM

(71) Applicant: CNH Industrial America LLC, New Holland, PA (US)

(72) Inventors: Jeffrey B. Fay, II, Wilmington, DE (US); Nathaniel Kip Totten, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/080,021

(22) Filed: Mar. 24, 2016

(65) Prior Publication Data

US 2017/0273246 A1 Sep. 28, 2017

(51) Int. Cl.
| | |
|---|---|
| *A01D 90/08* | (2006.01) |
| *B65H 27/00* | (2006.01) |
| *A01D 90/02* | (2006.01) |
| *B65G 67/04* | (2006.01) |
| *A01D 90/10* | (2006.01) |
| *A01D 87/00* | (2006.01) |
| *A01D 87/12* | (2006.01) |

(Continued)

(52) U.S. Cl.
CPC ............. *A01D 90/02* (2013.01); *A01D 85/00* (2013.01); *A01D 85/005* (2013.01); *A01D 87/0053* (2013.01); *A01D 87/122* (2013.01); *A01D 90/08* (2013.01); *A01D 90/10* (2013.01); *B60P 1/00* (2013.01); *B60P 1/48* (2013.01); *B60P 1/483* (2013.01); *B60P 1/486* (2013.01);

(Continued)

(58) Field of Classification Search
CPC .............. A01D 87/003; A01D 87/0053; A01D 87/0061; A01D 87/0076; A01D 87/0069; A01D 87/0084; A01D 87/122; A01D 87/125; A01D 87/126; A01D 87/127; A01D 90/083; A01D 90/10; A01D 90/08; A01D 90/02; A01D 2087/123; A01D 85/00; A01D 2085/007; A01D 2085/008; A01D 2090/086; A01D 85/005; Y10S 414/124; Y10S 414/112; Y10S 414/116; B60P 1/48; B60P 1/483; B60P 1/486; B60P 1/50; B60P 1/54; B60P 3/00; B60P 3/035; B60P 3/40; B60P 3/41; B60P 1/00; B65G 69/003; B65G 69/005; B65G 69/006; B65G 69/04; B65G 69/0408; B65G 69/0416; B65G 69/0433; B65G 69/0441; B65G 69/045; B65G 69/0458; B65F 3/00; B65F 2003/0223; B65F 2003/0226; B65F 2003/023; B65F 2003/0233; B65F 2003/0236; E01F 9/70
USPC ... 414/24.5, 24.6, 111, 397, 551, 555, 789.7
See application file for complete search history.

(56) References Cited

U.S. PATENT DOCUMENTS 3,927,771 A * 12/1975 Butler .................... A01D 90/08
414/501
4,408,942 A 10/1983 Butler et al.
(Continued)

*Primary Examiner* — Jeffrey A Shapiro
(74) *Attorney, Agent, or Firm* — Patrick M. Sheldrake

(57) ABSTRACT

A grasping mechanism for an agricultural bale wagon has a fixed grasping arm and a movable grasping arm. The movable grasping arm is translatable toward and away from the fixed grasping arm. The movable grasping arm can be rotated to define varying angular relationships between the fixed grasping arm and the movable grasping arm. Rotation and translation of the movable grasping arm are effected by an actuator. A resilient bumper between the fixed grasping arm and movable grasping arm is adjustable automatically to span the adjusted width between the fixed grasping arm and movable grasping arm.

18 Claims, 11 Drawing Sheets

(51) Int. Cl.
*A01D 85/00* (2006.01)
*B60P 1/48* (2006.01)
*B60P 1/00* (2006.01)
*B60P 3/00* (2006.01)
*B60P 1/50* (2006.01)

(52) U.S. Cl.
CPC ............... *B60P 3/00* (2013.01); *B65G 67/04* (2013.01); *B60P 1/50* (2013.01)

(56) References Cited

U.S. PATENT DOCUMENTS

| | | | |
|---|---|---|---|
| 6,171,046 B1 | 1/2001 | Nutcher | |
| 6,514,029 B2 * | 2/2003 | Millsap | A01D 90/08 414/24.5 |
| 2004/0165980 A1 * | 8/2004 | Huang | B65G 47/90 414/799 |
| 2005/0288841 A1 * | 12/2005 | Fackler | A01D 85/005 701/50 |
| 2006/0016634 A1 * | 1/2006 | Harris | A01D 90/08 180/333 |
| 2010/0299029 A1 * | 11/2010 | Fackler | A01D 90/08 701/50 |
| 2011/0078930 A1 * | 4/2011 | Dunn | A01D 87/0076 37/405 |
| 2013/0000261 A1 * | 1/2013 | Lyman | B65B 69/0025 53/492 |
| 2016/0021824 A1 * | 1/2016 | Sudbrack | B60P 1/48 701/50 |
| 2017/0202147 A1 * | 7/2017 | Millsap | A01D 90/08 |

* cited by examiner

BALE WAGON CLAMP MECHANISM

BACKGROUND OF THE INVENTION

1. Field of the Invention

The present invention relates generally to self-propelled agricultural bale wagons and, more particularly, to bale wagons of the type adapted to pick up large crop material bales of different sizes and to form stacks of the bales.

2. Description of the Related Art

Present day crop harvesting practices include the formation of large bales of crop material, such as hay or other crops, which are dropped in the field. Bale wagons are used to pick up the bales from the field, form the bales into a composite stack on the bale wagon and subsequently discharge the entire stack into a storage area. It is known for such bale wagons to include a first table which receives bales from a bale loader or pick up device mounted on the bale wagon. The first table accumulates a predetermined number of bales with the bales being arranged in a row in a pattern determined by a computer on board the bale wagon. A second table receives the rows of bales from the first table and accumulates several such rows. This group of rows is commonly referred to as a "tier". A third table or load bed then receives the tiers from the second table and accumulates these tiers to form a "stack" on the load bed. Once the stack has been accumulated on the load bed, it may be unloaded by pivoting the load bed 90 degrees and depositing the stack on the ground or other surface so that the first tier of bales which was accumulated on the second table is now the lowermost tier of the stack on the ground surface.

Current bale collecting systems on self-propelled bale wagons for large bales include a clamp that grasps the bale, lifts the bale, and deposits the bale on a first collecting table. Large bales can be formed in different sizes, such as, for example, bales that are three feet wide and bales that are four feet wide. When changing from collecting bales of one size to collecting bales of another size, known bale wagon systems require that the operator make manual adjustments to the bale wagon, such as changing the general spacing between the opposed clamp arms, and/or changing a cushioning bumper between the arms. For example, some bale wagons have a single rotational clamp arm that is actuated by a cylinder. The rotational arm rotates away from a rigid clamp arm in order to provide a large aperture to receive bales. By taking advantage of geometric relationships, only a short stroke of a cylinder is needed to actuate the mechanism. However, with this type of structure, changing from collecting bales of one size to collecting bales of another size requires the operator to adjust the overall width of the clamp by removing a hydraulic cylinder mount, pulling a pin and sliding the frame to the desired position for the new size bales to be collected. Then, the pin has to be reinserted, and the cylinder mount reconnected before bale pickup can be started. This is problematic if the operator inadvertently adjusts the mechanism incorrectly, or forgets to make a required adjustment. The time required for making the mechanical adjustments prolongs the time required to complete the pickup task.

Another type of pickup mechanism on a bale wagon engages the bales with a translational system, such as a simple, laterally sliding mechanism that extends and retracts to allow bales to enter the opening. While these mechanisms may be operable with bales of multiple widths, they cannot provide a wide aperture for bale entrance without providing an excessively long translational element for clamping the bales. For example, to provide a 6 foot wide opening for picking up 4 foot wide bales, the translational element must have a cylinder with 2 feet of extra travel. The extra length can result in increased weight, and can require extra structure, larger packaging and increased cycle time due to the extra stroke of the cylinder. Further, for the clamp to adjust down to 3 feet for small bales or lesser widths for transport, the length of the cylinder becomes prohibitively expensive.

What is needed in the art is a bale wagon system that can pick up bales of multiple sizes without the need for making manual adjustments to the mechanism.

SUMMARY OF THE INVENTION

The present invention provides a pickup system that uses a combination of translational and rotational elements to provide a wide aperture for bale entrance while using very little stroke to achieve a wide opening.

The invention in one form is directed to an agricultural bale wagon with a chassis, an articulating mechanism coupled to the chassis and a bale grasping mechanism coupled to the articulating mechanism. The bale grasping mechanism includes first and second grasping arms; a translational mechanism for moving one of the first and second grasping arms towards the other of the first and second grasping arms; a rotational mechanism rotating one of the first and second grasping arms relative to the other of the first and second grasping arms; and an actuator operatively connected to the translational mechanism and the rotational mechanism.

The invention in another form is directed to an agricultural bale wagon provided with a chassis, an articulating mechanism coupled to the chassis and a bale grasping mechanism coupled to the articulating mechanism. The bale grasping mechanism includes a fixed grasping arm and a movable grasping arm, a translational mechanism connecting the fixed grasping arm and the movable grasping arm and configured for moving the movable grasping arm toward and away from the fixed grasping arm, a rotational mechanism connecting the fixed grasping arm and the movable grasping arm and configured for rotating the movable grasping arm relative to the fixed grasping arm, and an actuator operatively connected to the translational mechanism and the rotational mechanism.

The invention in still another form is directed to an agricultural bale wagon provided with a bale grasping mechanism including a fixed grasping arm and a movable grasping arm. A translational mechanism connects the fixed grasping arm and the movable grasping arm. The translational mechanism includes a sliding member movable along a fixed member. A rotational mechanism connects the sliding member and the movable grasping arm, and the movable grasping arm is rotatably carried on the sliding member. An actuator is operatively connected to the fixed member and the sliding member.

An advantage of the present invention is that the bale grasping mechanism can accommodate bales of different sizes without the need for manually adjusting the bale grasping structure.

Another advantage is that a wide entrance opening is provided at the distal ends of the bale grasping arms.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
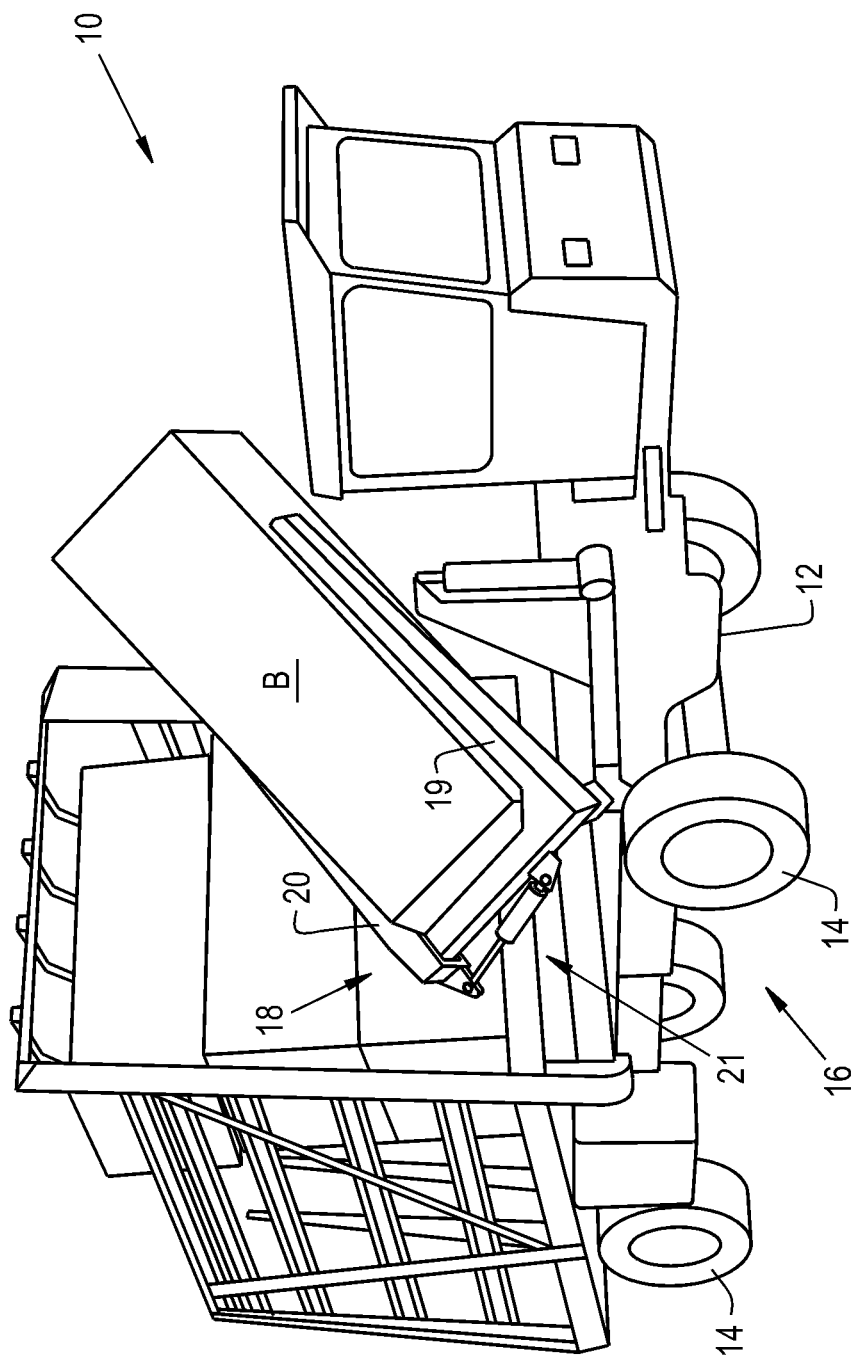
FIG. 1 is a side perspective view of an agricultural bale wagon that uses an embodiment of a system for the detection of the sizes of the bales it picks up of the present invention.
Figure 2:
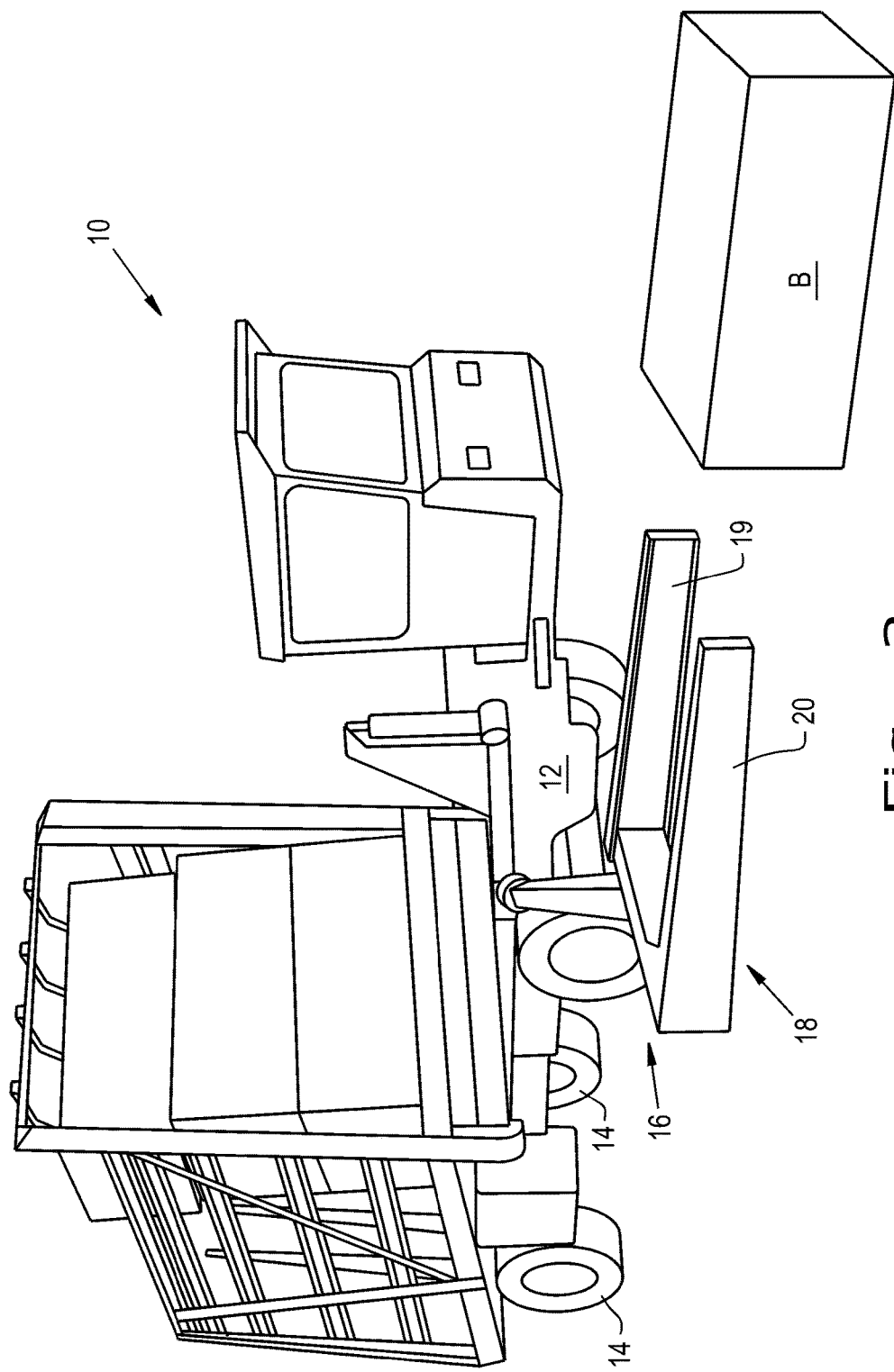
FIG. 2 is another view of the bale wagon of FIG. 1 before it encounters a bale.

Referring now to the drawings, and more particularly to FIGS. 1-9, there is shown a bale wagon 10 having a chassis 12, wheels 14, an articulating mechanism 16, and a grasping mechanism 18. Wheels 14 are coupled to chassis 12 and provide support to chassis 12. Articulating mechanism 16 is coupled to chassis 12 and to grasping mechanism 18, and provides the lifting, orientating and stacking functions of a bale that is grasped by grasping mechanism 18, to position bales on bale wagon 10.

Grasping mechanism 18 includes grasping arms 19 and 20, a translational mechanism 21 including a clamp cylinder or actuator 22, a bumper 24, springs 26, a sliding member 28, a bumper sensor 30, a transport sensor 32, a three foot sensor 34, a four foot sensor 36 and a fixed plate or channel 42. Grasping arms 19 and 20 are arranged to engage and hold a bale B in a squeezing, grasping or clamping fashion. Accordingly, grasping arm 19 is in a fixed position, and grasping arm 20 is movable relative to grasping arm 19. Translational mechanism 21, through the operation of actuator 22 and the guidance of sliding member 28 in, on or against channel 42, moves grasping arm 20 by causing sliding member 28 to move so that arm 20 moves toward or away from arm 19.

Grasping mechanism 18 further includes a rotational mechanism 48 that includes, in addition to the aforementioned actuator 22, an upper rocker arm 50, a link 52 and a lower rocker arm 54 connecting upper rocker arm 50 and link 52. Actuator 22 can be a hydraulic cylinder and is held by a pivotal connection 56 to a frame member 58 that is fixed relative to arm 19. At the opposite end, actuator 22 has a pivotal connection 60 to one end of upper rocker arm 50. Upper rocker arm 50 is a curved, somewhat boomerang shaped body of plate steel or the like. Lower rocker arm 54 is generally straight. A shaft 62 extends through upper rocker arm 50 near an end thereof opposite to connection 60. Shaft 62 also extends through one end of lower rocker arm 54. Upper rocker arm 50 and lower rocker arm 54 are arranged with respect to shaft 62 so that upper rocker arm 50 projects laterally from shaft 62 in one direction and lower rocker arm 54 projects laterally from shaft 62 essentially in opposite direction from upper rocker arm 50. Shaft 62 extends through upper rocker arm 50 and lower rocker arm 54, and outwardly extending end portions of shaft 62 are held pivotally in a bracket 64 that is attached to sliding member 28. Upper rocker arm 50 and lower rocker arm 54 are rigidly held to shaft 62 by welding or the like so that the assembly of upper rocker arm 50, shaft 62 and lower rocker arm 54 are rigidly held one with respect to the others. Shaft 62 is rotationally held by bracket 64. At an opposite end of lower rocker arm 54 from shaft 62, lower rocker arm 54 forms a pivotal connection 66 with one end of curved link 52. The opposite end of link 52 from pivotal connection 66 forms a pivotal connection 68 at a proximal end portion of grasping arm 20. Grasping arm 20 has a pivotal connection 70 to sliding member 28.

Bumper 24 is positioned between arms 19 and 20 and is configured to move as it contacts a bale. Springs 26 bias bumper 24 outward and are compressed when a bale contacts bumper 24. The movement of bumper 24 is detected by the activation of bumper sensor 30, thereby indicating the presence of a bale between arms 19 and 20. Sensors 32, 34 and 36 are mounted to fixed plate or channel 42, with sliding member 28 sliding along triggering sensors 32, 34 and 36 dependent upon whether sliding member 28 is proximate to sensors 32, 34 and 36, this triggering then providing feedback to detect the position of sliding member 28 and thereby whether a bale has been dropped, or if the bale is three feet wide or four feet wide.

Figure 3:
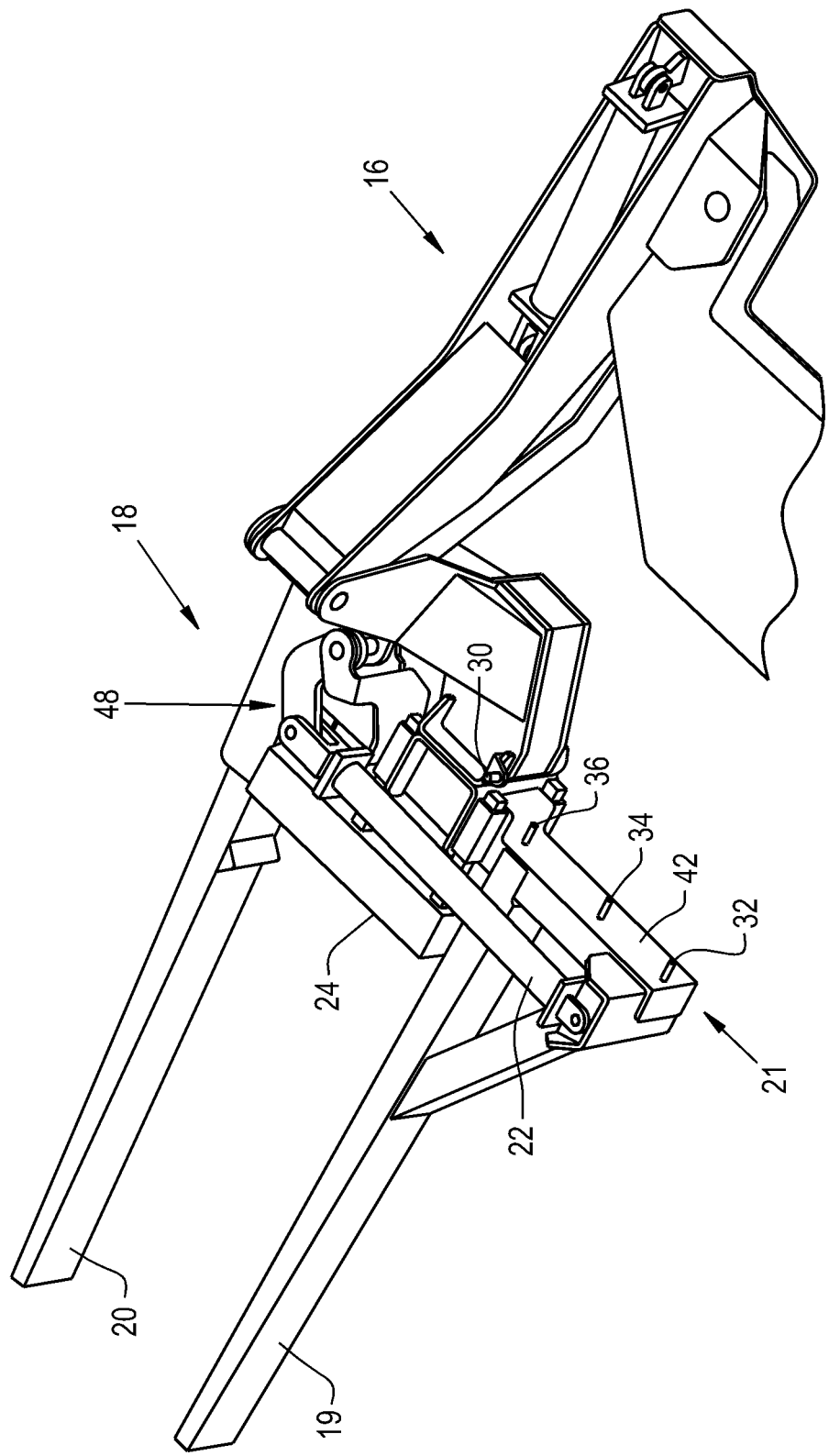
FIG. 3 is a perspective view of the grasping mechanism of the present invention used with the bale wagons of FIGS. 1 and 2.
Figure 4:
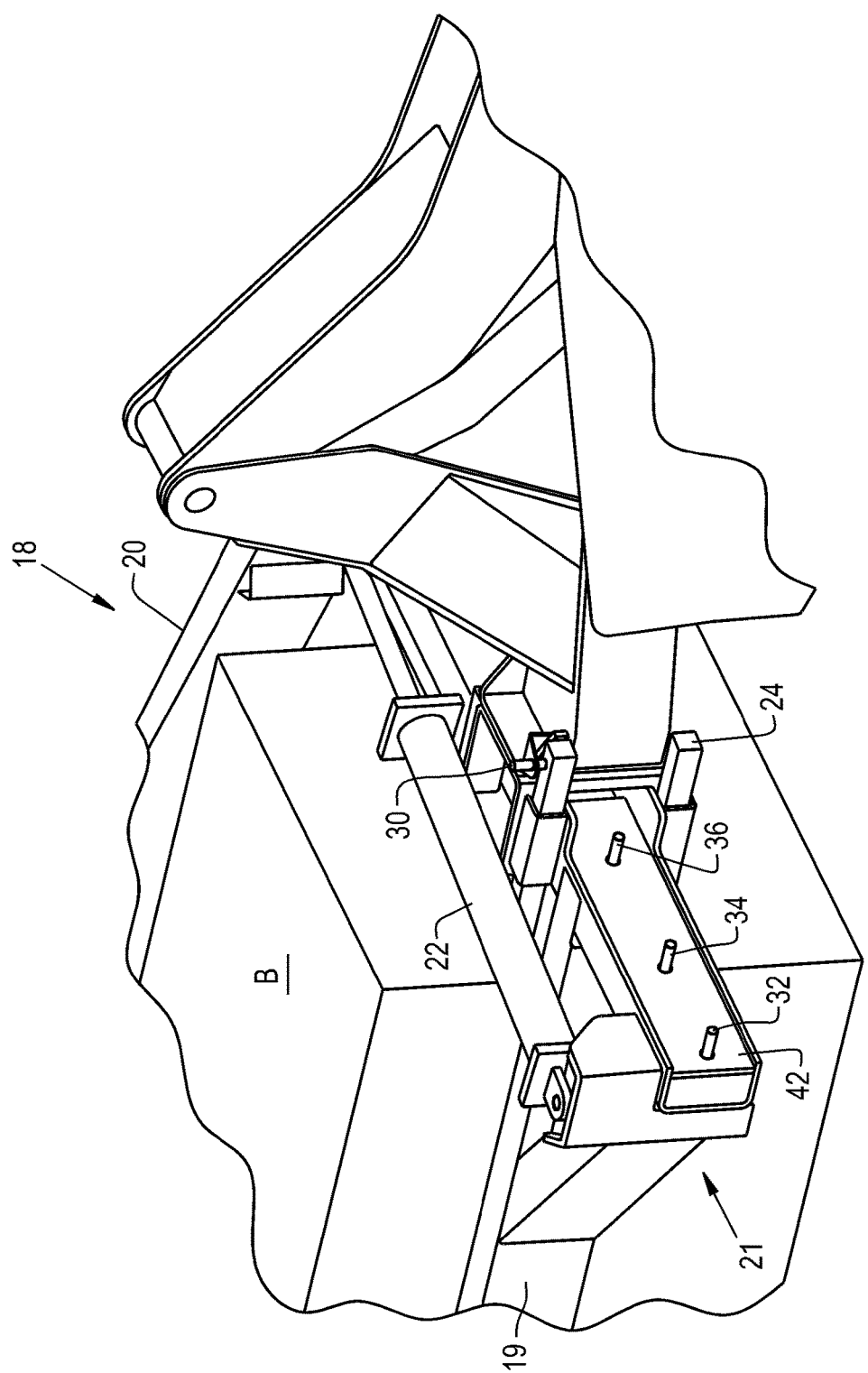
FIG. 4 is a closer perspective view of the grasping mechanism of FIG. 3.
Figure 5:
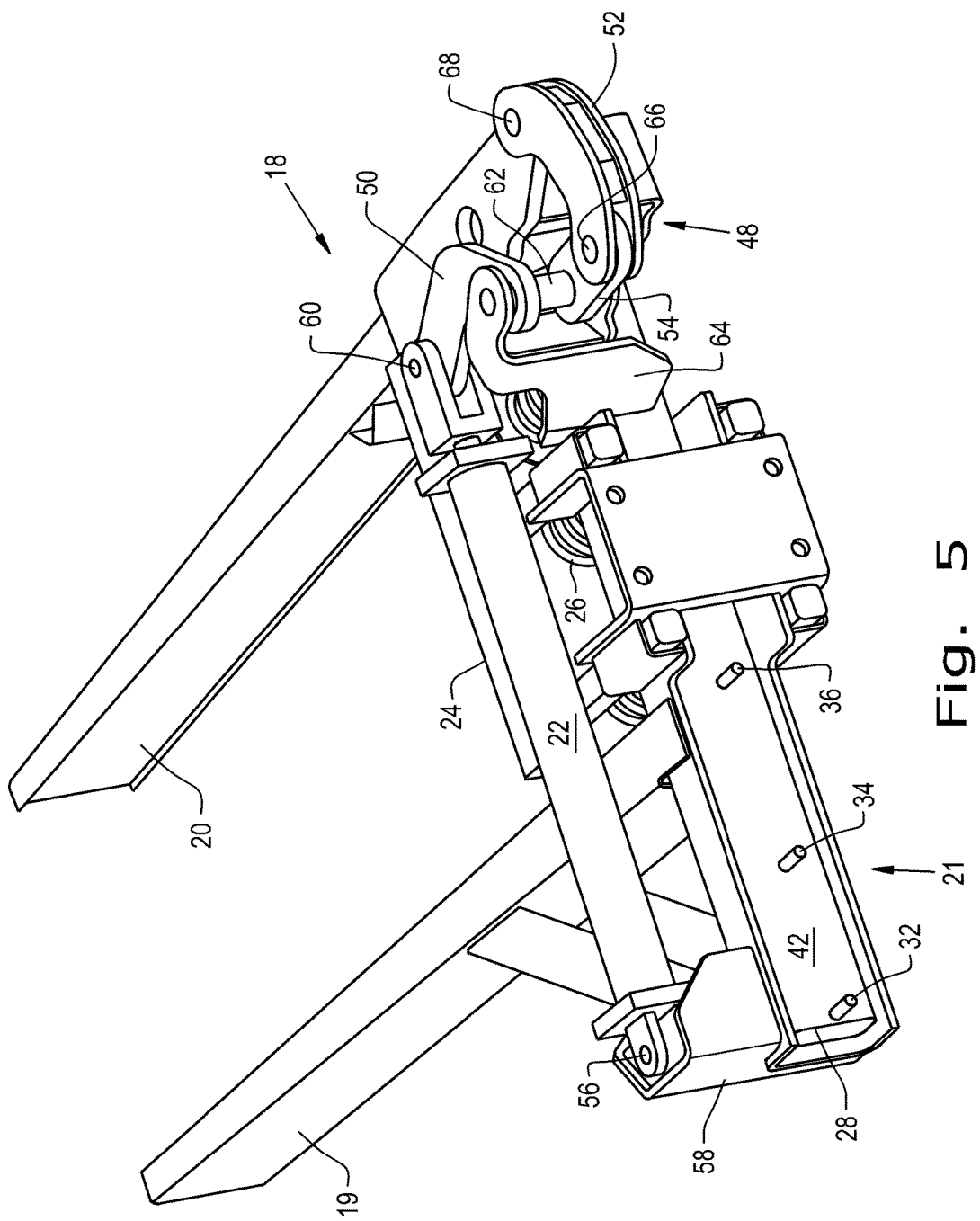
FIG. 5 is another perspective view of the grasping mechanism of FIGS. 3 and 4.
Figure 6:
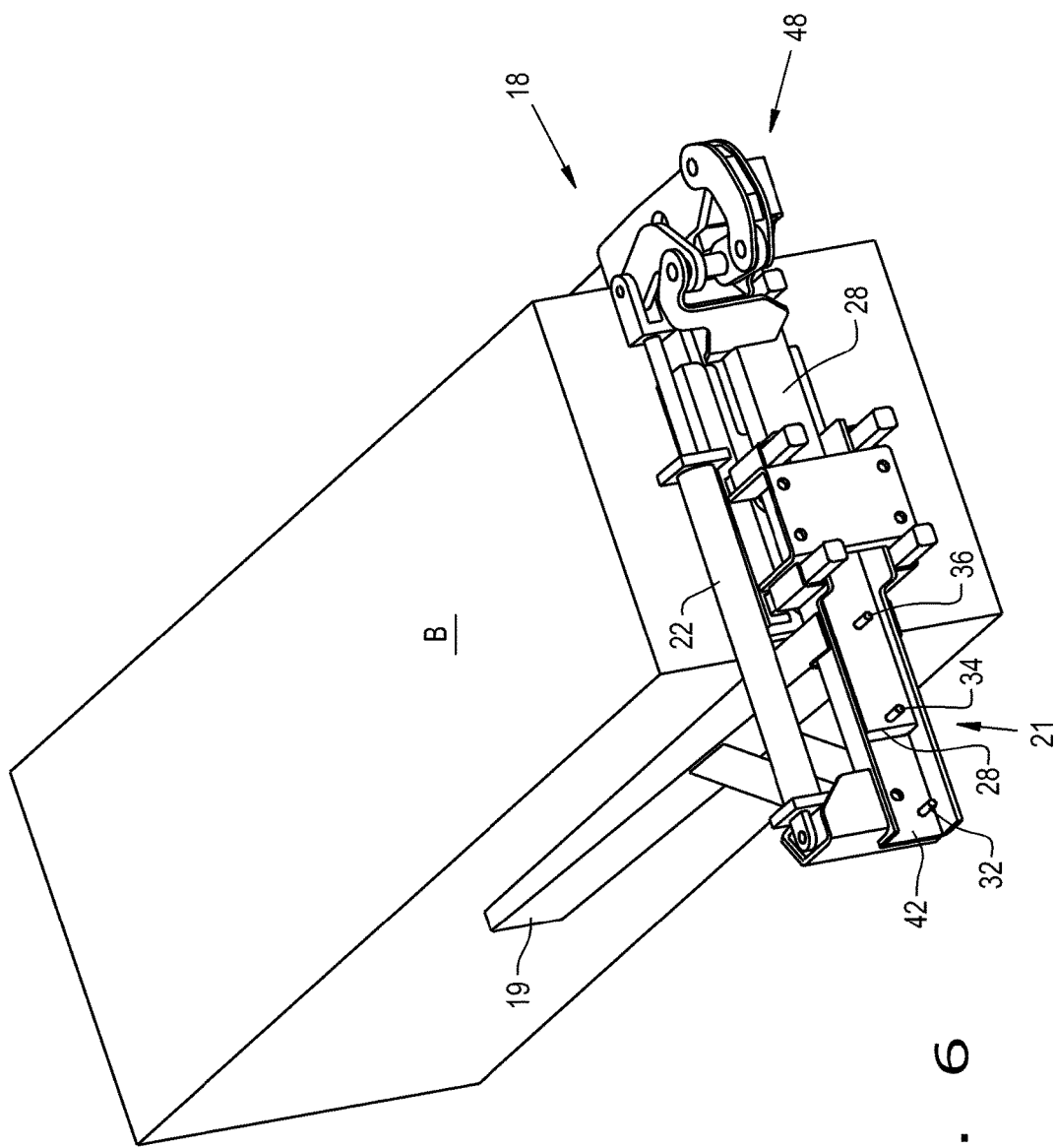
FIG. 6 is a view of the grasping mechanism of FIGS. 3-5 grasping a 3 foot bale.
Figure 7:
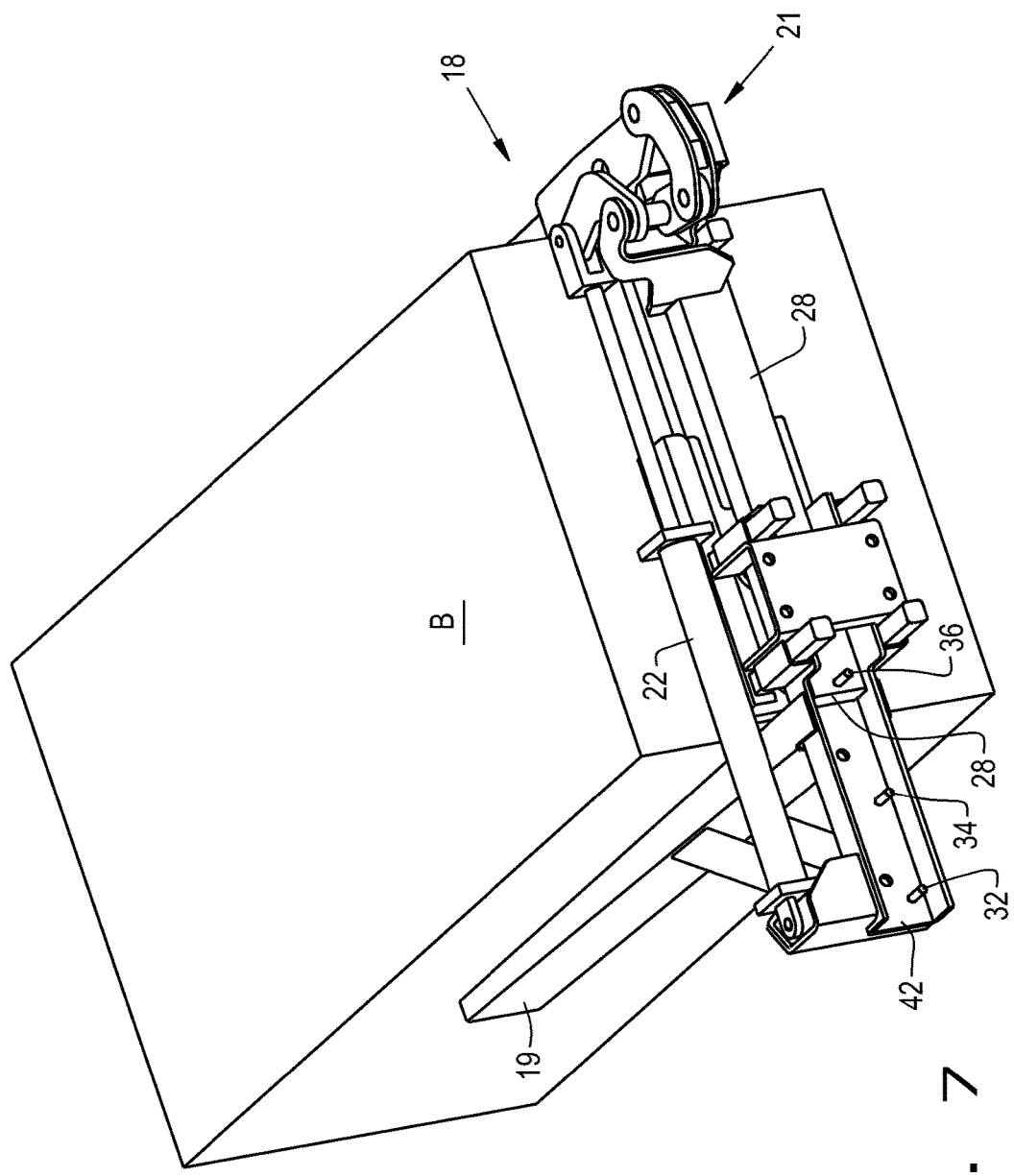
FIG. 7 is a view of the grasping mechanism of FIGS. 3-6 grasping a 4 foot bale.

In looking at FIGS. 3 and 4, it can be seen that with no bale in FIG. 3 bumper 24 is biased outward. With a bale present, bumper 24 is pushed back with a portion of bumper 24 extending back as can be seen in FIG. 4. This triggers sensor 30 to indicate the presence of bale B being between arms 19 and 20. Sequentially looking at FIGS. 5-7 sensors 32, 34 and 36, which are mounted to plate 42, are shown as though looking through sliding member 28, with the left portion of sliding member 28 shown in some of the Figs. The position of sliding member 28 relative to sensors 34 and 36 determine the width of bale B. For example in FIG. 4, bale B has contacted bumper 24 and sliding member 28 is to the right not covering any of sensors 32, 34 and 36, with arms 19 and 20 fully open. In FIG. 5 arms 19 and 20 are positioned in a transport mode and sliding member 28 completely encompasses sensors 32, 34, 36. In FIG. 6 sensors 34 and 36 are beneath sliding member 28 causing them to be triggered, and sensor 32 is not triggered indicating that a three foot bale is present. In FIG. 7 sensor 36 is triggered by the proximity of sliding member 28 with sensors 32 and 34 being not triggered to then indicate that a four foot bale B being present.

Bumper 24 reduces shock from bale contact because of the resilient yielding of springs 26. Further, bumper 24 extends across the full width of the opening between grasping arms 19 and 20 for all adjusted widths between the arms. Bumper 24 includes a laterally fixed plate 72 connected to fixed channel 42 and a laterally translatable plate 74 which slides over laterally fixed plate 72 and is connected to sliding member 28. Accordingly, as grasping arm 20 is move toward or away from grasping arm 19, laterally translatable plate 74 slides along laterally fixed plate 72, to increase or decrease the overlap of the plates. Thus, the width of bumper 24 is adjusted together with adjustment in the spacing between grasping arms 19 and 20, all through the operation of the single actuator 22.

Figure 8:
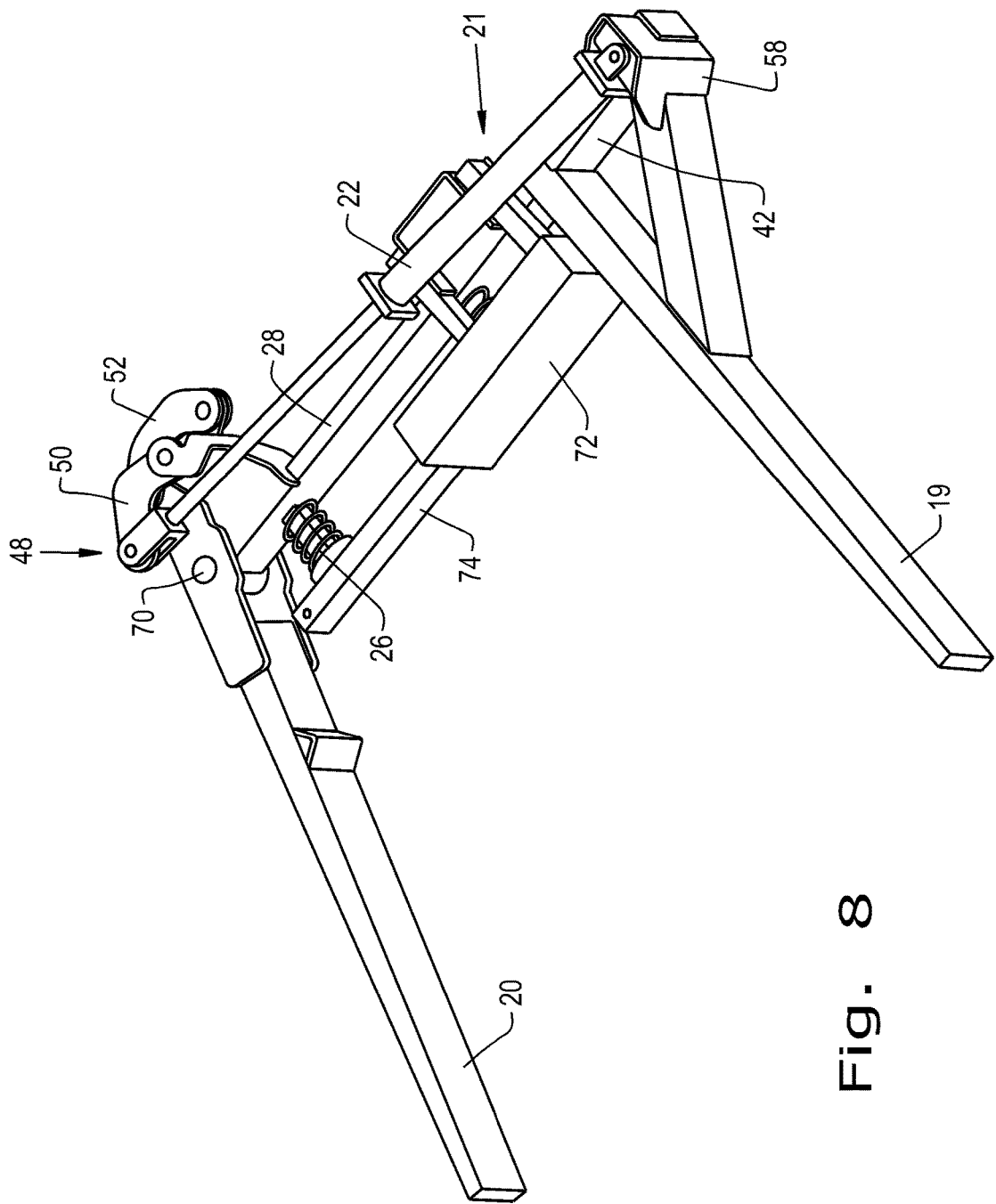
FIG. 8 is a perspective view of the grasping mechanism adjusted for receiving a bale.
Figure 9:
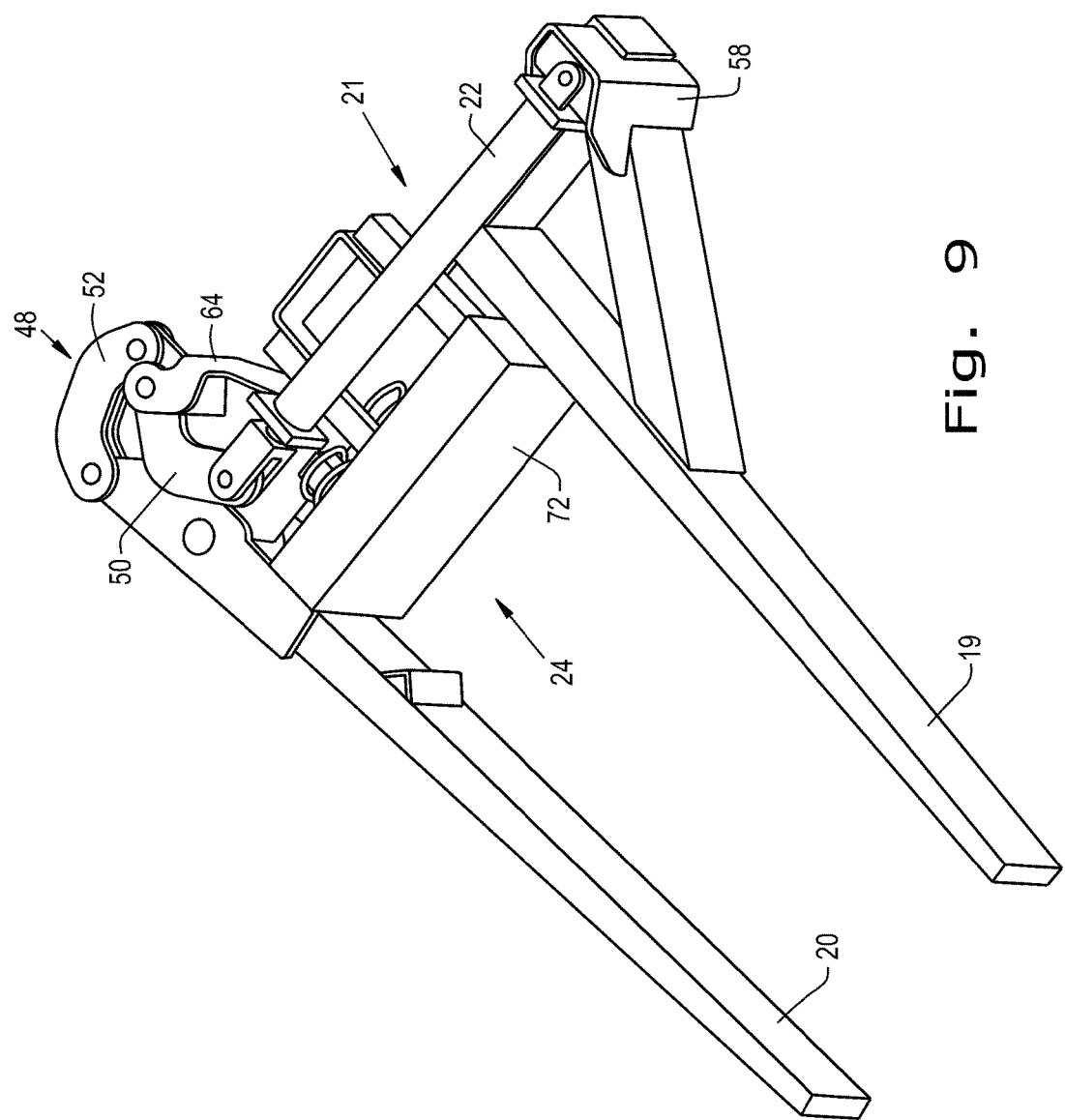
FIG. 9 is a perspective view similar to that of FIG. 8, but illustrating the grasping mechanism adjusted for transport.

Through the operation of translational mechanism 21, grasping arm 20 is caused to translate toward and away from grasping arm 19 as actuator 22 is withdrawn or extended. Sliding member 28 moves along channel 42 under the operation of actuator 22. Additionally, however, rotational mechanism 48 causes grasping arm 20 to pivot about the pivotal connection 70 between grasping arm 20 and sliding member 28. When actuator 22 is being extended, the interconnection of upper rocker arm 50, lower rocker arm 54, link 52 and the pivotal connections to grasping arm 20 cause grasping arm 20 to rotate outwardly, so that distal ends of grasping arms 19 and 20 are more distantly spaced than proximal ends of grasping arms 19 and 20, as shown in FIG. 8. When actuator 22 is being retracted, the resistance from encountering the bale causes the translational action to stop, at which time only rotational action can continue. Arm 20 continues to rotate inwardly until arms 19 and 20 engage the bale along the full extent of the bale, as shown in FIGS. 6 & 7. Still further, with no bale present between arms 19 and 20, actuator 22 can be fully retracted such that grasping arm 20 closely approaches grasping arms 19. Fixed plate 72 fully covers translatable plate 74 therebehind, and rotational mechanism 48 has rotated grasping arm 20 to be parallel to or slightly inwardly directed at the distal ends of the arms. This transport position is shown in FIG. 9.

Figure 10:
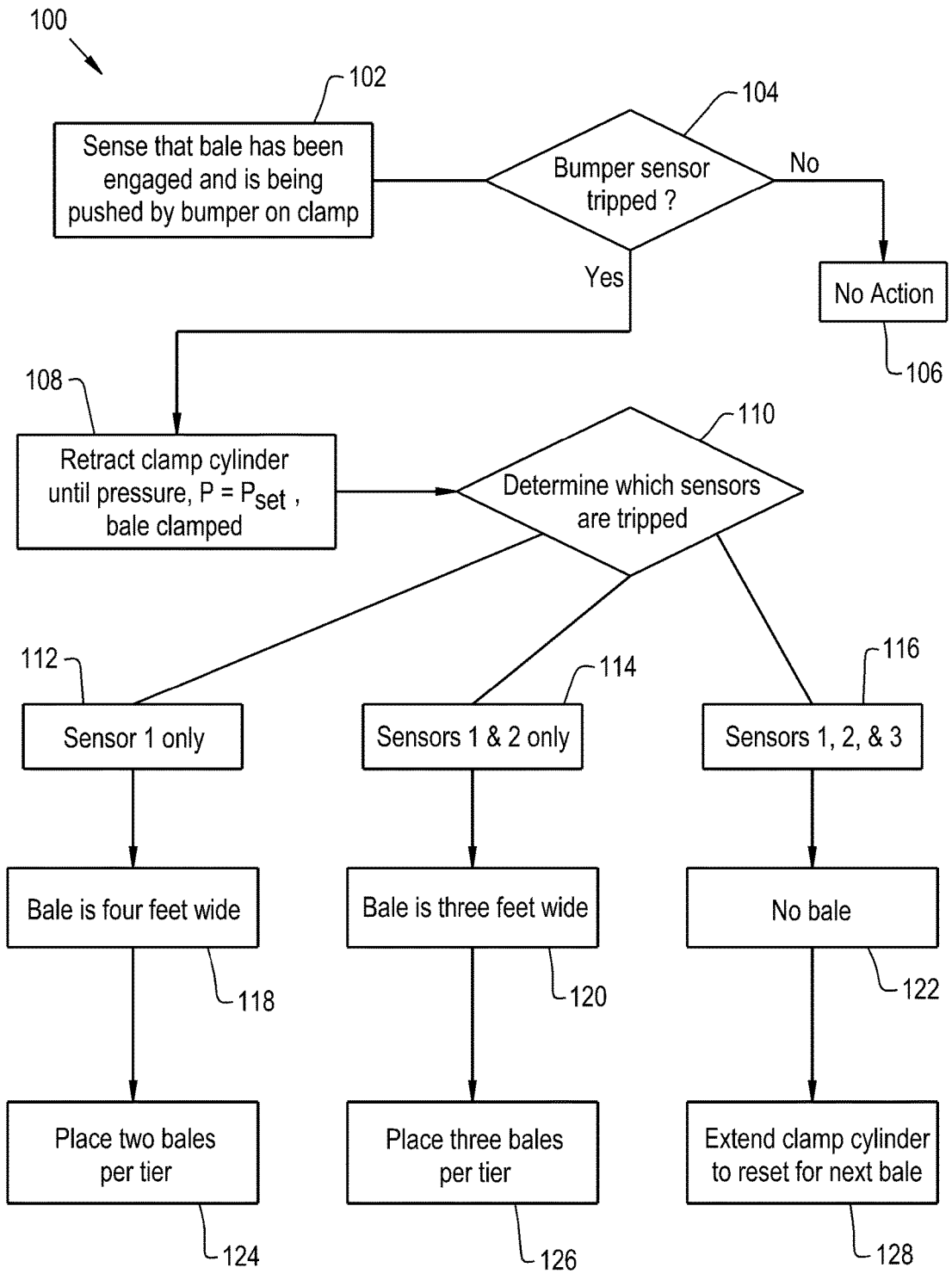
FIG. 10 is a flowchart depicting the logic of an embodiment of the grasping system of the present invention.
Figure 11:
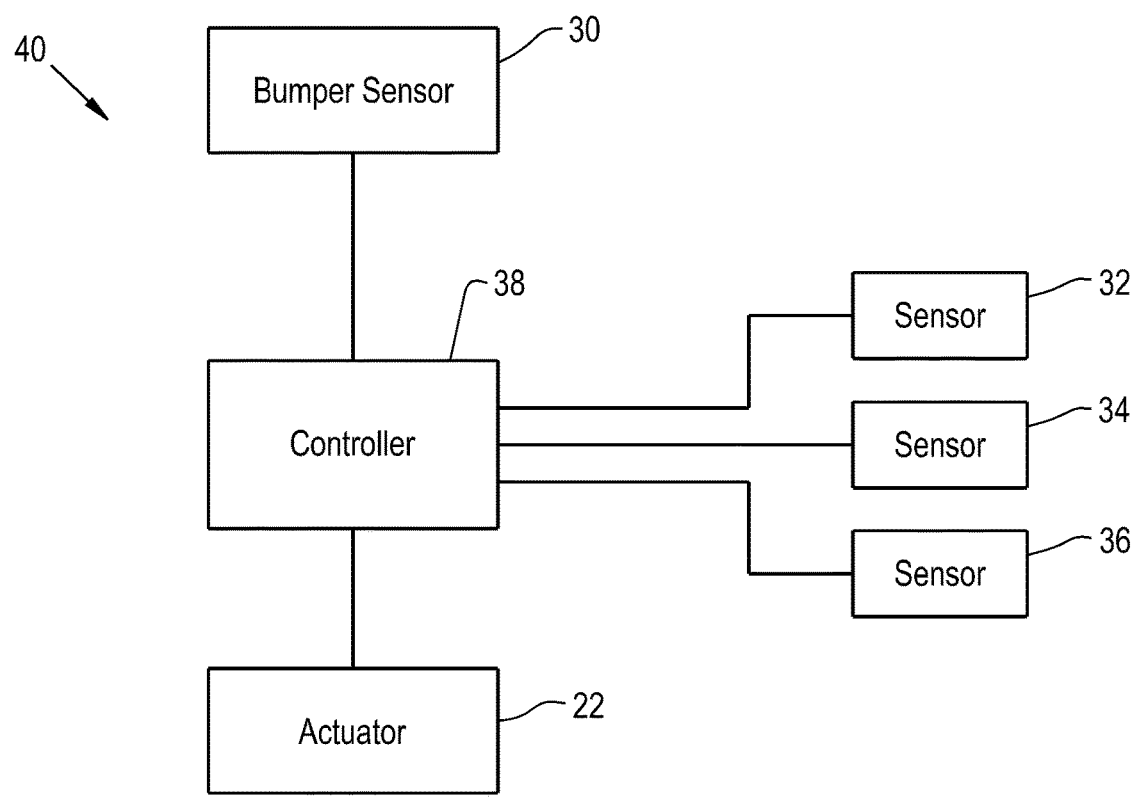
FIG. 11 is a schematical block diagram of the grasping system that carries out the method of FIG. 10.

Now additionally referring to FIGS. 10 and 11, there is shown a method 100 to control grasping mechanism 18 and a structure of the system to carry out method 100. Proposed here is an algorithm 100 to use feedback from the bale clamp position in order to determine the size of a bale and thus determine the tier stack pattern. Method 100 also provides automatic clamp initiation when bale B contacts bumper 24 thereby activating sensor 30.

The system executes method 100 as follows: 1. The control system 40 senses that a bale B has been engaged by the bumper 24 of the clamp 18 (see step 102). This is accomplished by the bumper 24 being pushed back, with respect to the clamp frame, and tripping a frame mounted sensor 30 (see step 104). If no bale is sensed method 100 proceeds to step 106. 2. Upon sensing bale B, the control system 40 by way of controller 38 retracts clamp cylinder 22, which squeezes bale B. 3. When the pressure in the cylinder reaches a predetermined set point (see step 108), as a pressure adequate to clamp and hold bale B, the system 40 determines the width of bale B based on the position of the translational element 28 of the clamp. 4. If only the four foot (first) sensor 36 is tripped (see steps 110 and 112), the bale is four feet wide (step 118), then the system 40 determines that two bales are to be placed per tier (step 124). If the first sensor 32 and three foot sensor 34 (second sensor) are tripped (see steps 110 and 114), the system 40 determines that bale B is three feet wide (step 120) and that three bales are to be placed per tier (step 126). If the four foot sensor 36, three foot sensor 34, and transport sensor 32 are all tripped (see steps 110 and 116), the clamp 18 has retracted to the transport position and there is not a bale in clamp 18 (either a false reading on bumper sensor 30 or a dropped/broken bale has occurred). In this case, the clamp cylinder 22 is extended and the system 40 re-sets to clamp another bale, no bales are added to a tier. The logic controlling tier formation, i.e. bale count, will be used after the bale size has determined the stack pattern by the present invention.

Advantageously, with the present invention an operator can enter a field and not have to consider bale size when collecting bales, rather, the operator can simply begin picking up bales, and grasping mechanism 18 will adjust automatically to the new size bales.

This system will eliminate the very likely scenario where the operator has been collecting bales of one size, and goes to another field to collect bales of another size but forgets to set the controller to the new size, as is required with prior art systems.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural bale wagon, comprising:
   a chassis;
   an articulating mechanism coupled to the chassis;
   a bale grasping mechanism coupled to the articulating mechanism and including first and second grasping arms;
   a translational mechanism connecting a first and a second grasping arm and comprising a movable portion permitting translational movement between the first and second grasping arms;
   a rotational mechanism for rotating one of the first and second grasping arms relative to the other of the first and second grasping arms;
   the first grasping arm being rotatably carried on a movable member of the translational mechanism and configured for rotation about a pivot point; and
   an actuator operatively connected to the movable portion and the rotational mechanism, such that the actuator is configured for adjusting the lateral position of the first grasping arm with respect to the second grasping arm and for adjusting the lateral position of the first grasping arm relative to the pivot point, the actuator also adjusting the pivotal position of the first grasping arm about the pivot point.

2. The agricultural bale wagon of claim 1, wherein one of the first and second grasping arms is in a fixed position.

3. The agricultural bale wagon of claim 1, wherein the translational mechanism includes a sliding member movable along a fixed member.

4. The agricultural bale wagon of claim 3, wherein the rotational mechanism includes a curved rocker arm and a curved link connected in series.

5. The agricultural bale wagon of claim 3, wherein the rotational mechanism includes a first rocker arm having a pivotal connection near one end thereof to a link and the other end of the first rocker arm being connected to the actuator.

6. The agricultural bale wagon of claim 5, wherein a lower rocker arm connects the first rocker arm to the link.

7. The agricultural bale wagon of claim 6, wherein the link is connected to one of the grasping arms.

8. The agricultural bale wagon of claim 1, further comprising a biased bumper having a translationally fixed plate and a translatable plate movable along the translationally fixed plate such that a bale contacting width of the bumper is adjusted as a lateral distance between the first grasping arm and the second grasping arm is adjusted by the actuator.

9. An agricultural bale wagon, comprising:
a chassis;
an articulating mechanism coupled to the chassis;
a bale grasping mechanism coupled to the articulating mechanism and including a fixed grasping arm and a movable grasping arm;
a translational mechanism connecting the fixed grasping arm and the movable grasping arm and configured for moving the movable grasping arm toward and away from the fixed grasping arm;
a rotational mechanism connecting the fixed grasping arm and the movable grasping arm and configured for rotating the movable grasping arm relative to the fixed grasping arm;
an actuator operatively connected to the translational mechanism and the rotational mechanism;
the translational mechanism comprising a fixed frame member carried by the chassis and a slidable member connected to the movable grasping arm; and the actuator is connected between the fixed frame member and the slidable member; and
a first rocker arm having one end thereof pivotally carried by the sliding member and another end thereof connected to the actuator; and a link having one end thereof connected to the first rocker arm and a second end thereof connected to the movable grasping arm.

10. The agricultural bale wagon of claim 9, wherein the movable grasping arm is pivotally carried by the sliding member.

11. A bale grasping assembly for an agricultural bale wagon, comprising:
a bale grasping mechanism comprising a fixed grasping arm and a movable grasping arm;
a translational mechanism connecting the fixed grasping arm and the movable grasping arm, the translational mechanism comprising a sliding member movable along a fixed member;
a rotational mechanism connecting the sliding member and the movable grasping arm;
the movable grasping arm being rotatably carried on the sliding member and configured for rotation about a pivot point; and
an actuator operatively connected to the fixed member and the sliding member, such that the actuator is configured for adjusting the lateral position of the movable grasping arm with respect to the fixed grasping arm and for adjusting the lateral position of the movable grasping arm relative to the pivot point, the actuator also adjusting the pivotal position of the movable grasping arm about the pivot point.

12. The bale grasping assembly of claim 11, wherein the rotational mechanism comprises a first a curved rocker arm and a curved link connected in series.

13. The bale grasping assembly of claim 11, further comprising a rocker arm having one end connected to the actuator and another end pivotally carried on the sliding member.

14. The bale grasping assembly of claim 13, further comprising a link having one end thereof connected to the rocker arm, and another end thereof connected to the movable grasping arm.

15. The bale grasping assembly of claim 14, further comprising a bumper having a translationally fixed plate connected to the fixed member, and a translatable plate connected to the sliding member, such that a bale contacting width of the bumper is adjusted as a lateral distance between the first grasping arm and the second grasping arm is adjusted by the actuator.

16. The agricultural bale wagon of claim 1, further comprising a control system connected to the actuator, wherein a sensor connected to the control system is configured to sense that a bale has contacted a bumper, upon sensing a bale the control system controls the actuator to adjust the lateral distance between the first arm and the second arms.

17. The agricultural bale wagon of claim 16, wherein when pressure associated with the actuator reaches a predetermined pressure, to hold the bale, the control system is configured to detect a width of the bale.

18. The agricultural bale wagon of claim 16, wherein the control system is configured to determine a stacking pattern based on a detected width of the bale.

* * * * *